United States Patent
Barksdale et al.

(10) Patent No.: US 9,602,948 B2
(45) Date of Patent: Mar. 21, 2017

(54) MOTOR VEHICLE AUDIO SYSTEM

(71) Applicant: Bose Corporation, Framingham, MA (US)

(72) Inventors: Tobe Z. Barksdale, Bolton, MA (US); Douglas J. Holmi, Marlborough, MA (US)

(73) Assignee: Bose Corporation, Framingham, MA (US)

( * ) Notice: Subject to any disclaimer, the term of this patent is extended or adjusted under 35 U.S.C. 154(b) by 0 days.

(21) Appl. No.: 15/084,980

(22) Filed: Mar. 30, 2016

(65) Prior Publication Data

US 2016/0212565 A1    Jul. 21, 2016

Related U.S. Application Data

(62) Division of application No. 14/463,956, filed on Aug. 20, 2014, now Pat. No. 9,344,788.

(51) Int. Cl.
| | |
|---|---|
| *H04R 5/02* | (2006.01) |
| *H04S 7/00* | (2006.01) |
| *H04R 1/02* | (2006.01) |
| *B60N 2/00* | (2006.01) |

(52) U.S. Cl.
CPC ............. *H04S 7/308* (2013.01); *B60N 2/002* (2013.01); *H04R 1/028* (2013.01); *H04S 7/303* (2013.01); *H04R 5/023* (2013.01); *H04R 2420/07* (2013.01); *H04R 2499/13* (2013.01); *H04S 2400/13* (2013.01)

(58) Field of Classification Search
CPC ........ H04R 1/26; H04R 1/345; H04R 1/2834; H04R 19/02; H04R 1/24; H04R 3/04; H04R 1/02; H04R 5/02; H04R 1/026; H04R 1/323; H04R 23/00; H04R 1/00; H04R 1/403; H04R 1/021; H04R 1/2803; H04R 1/2811; H04R 1/2819; H04S 7/307; H04S 2400/01; H04S 3/002; H04S 1/00; H04S 3/00; H04S 7/30; H04S 2400/07; H04S 7/00; H04S 7/301
USPC ....... 381/86, 17–23, 123, 63, 104–107, 109, 381/302, 310
See application file for complete search history.

(56) References Cited

U.S. PATENT DOCUMENTS

| | | | | |
|---|---|---|---|---|
| 5,233,661 | A * | 8/1993 | Kawamura | H04R 27/00 381/61 |
| 5,241,605 | A * | 8/1993 | Mori | H03G 5/04 381/101 |
| 5,661,811 | A * | 8/1997 | Huemann | H04R 5/04 381/309 |
| 7,039,207 | B1 * | 5/2006 | Elrod | A47C 7/72 297/217.3 |

(Continued)

*Primary Examiner* — Lun-See Lao
(74) *Attorney, Agent, or Firm* — Brian M. Dingman; Dingman IP Law, PC

(57) ABSTRACT

A motor vehicle audio system, and a method of operating such a system. There is at least one rear far-field speaker that is located behind a front seat of the motor vehicle, and at least one near-field speaker located in front of the far-field speaker and close to an intended position of a listener's head. There is an audio signal processor configured to detect when the rear far-field speaker is shut off while the near-field speaker remains on, and in response automatically increase the output energy of the near-field speaker.

19 Claims, 3 Drawing Sheets

(56) References Cited

U.S. PATENT DOCUMENTS

| | | | |
|---|---|---|---|
| 7,190,798 B2 * | 3/2007 | Yasuhara | H04B 1/205 381/123 |
| 2004/0091123 A1 * | 5/2004 | Stark | H04B 1/082 381/86 |
| 2008/0273713 A1 * | 11/2008 | Hartung | H04R 5/02 381/86 |

* cited by examiner

MOTOR VEHICLE AUDIO SYSTEM

CROSS-REFERENCE TO RELATED APPLICATION

This application is a divisional of and claims priority to U.S. patent application Ser. No. 14/463,956, filed on Aug. 20, 2014.

BACKGROUND

This disclosure relates to an audio system for motor vehicles.

Motor vehicle audio systems often have speakers located in the front and the rear. Speakers may be found in many locations. Frequently, they are located in the doors and the front and rear deck. In some cases there is a separate bass source, often located in the rear.

It is sometimes desirable to turn off some but not all of the speakers. For example, the rear speakers may be shut off so as to quiet the second or third row of seats. However, shutting off any speakers behind the front seat alters the sound received by the front seat passengers, which may degrade the passengers' listening experience.

SUMMARY

When speakers located behind the front seat of a motor vehicle are shut off, the sound that is perceived by the front seat passengers will change. This is due to the fact that no audio energy will be received from the locations of the disabled speakers. The effects can be ameliorated by altering the output of other speakers so as to mimic the sound that had been received by each ear of front seat passengers from the now-disabled speakers.

In this disclosure, a motor vehicle audio system is operated such that when one or more speakers that are located rearward of (behind) the front seat are shut off, the output of one or more other speakers that are closer to one or more of the front seat passengers is automatically increased. A goal of the system is to partially or fully replace the audio energy that was lost when the speakers were shut off. The system can optionally also be operated such that this replacement energy is perceived by the listener to have come from the locations of the disabled speakers. In one non-limiting example, the system includes a pair of speakers mounted in each of the front seat headrests, close to the expected location of the listeners' ears. These speakers can be operated so as to approximate the transfer function from each speaker that was shut off to each ear of the front seat occupants.

All examples and features mentioned herein can be combined in any technically possible way.

In one aspect, a method of operating a motor vehicle audio system that has at least one rear far-field speaker that is located behind a front seat of the motor vehicle, and that also has at least one near-field speaker located in front of the far-field speaker and close to an intended position of a listener's head, includes detecting when the rear far-field speaker is shut off while the near-field speaker remains on and in response automatically increasing the output energy of the near-field speaker.

Embodiments may include one of the following features, or any combination thereof. Automatically increasing the output energy of the near-field speaker may comprise operating the near-field speaker so as to at least partially replace the audio energy lost when the rear far-field speaker was shut off. Operating the near-field speaker so as to at least partially replace the audio energy lost when the rear far-field speaker was shut off may comprise operating the near-field speaker so as to deliver approximately the same audio energy to the expected location of each ear of a front seat listener's position as was delivered before the far-field speaker was shut off. Operating the near-field speaker so as to deliver approximately the same audio energy to the expected location of each ear of a front seat listener's position as was delivered before the far-field speaker was shut off may comprise adjusting an equalization of the near field speaker.

Embodiments may include one of the following features, or any combination thereof. A transfer function from each far-field speaker that was shut off to the expected location of each ear of a front seat listener's position may be known, and automatically increasing the output energy of the near-field speaker may comprise operating the near-field speaker so as to approximate the transfer functions from each far-field speaker that was shut off, to the expected location of each ear of a front seat listener's position. The front seat of the motor vehicle may comprise a driver headrest and a passenger headrest, and the motor vehicle audio system may comprise a pair of near-field speakers in each front seat headrest. The motor vehicle audio system may comprise a plurality of rear far-field speakers, and automatically increasing the output energy of the near-field speaker may comprise operating the pair of near-field speakers in a headrest so as to approximately replace the audio energy lost at the expected location of each ear of a front seat listener's position. The motor vehicle audio system may comprise a user-operated switch that is part of an audio head unit and that can be operated so as to shut off the far-field speaker.

In another aspect a method of operating a motor vehicle audio system that has a plurality of rear far-field speakers that are located behind a front seat of the motor vehicle, wherein the front seat of the motor vehicle comprises a driver headrest and a passenger headrest, and wherein the motor vehicle audio system comprises a pair of near-field speakers in each such front seat headrest, includes detecting when one or more of the rear far-field speakers are shut off while at least one near-field speaker remains on and in response automatically operating the pair of near-field speakers in a headrest so as to deliver approximately the same audio energy to the expected location of each ear of a front seat listener's position as was delivered before the far-field speakers were shut off.

Embodiments may include one of the following features, or any combination thereof. Operating the near-field speakers so as to deliver approximately the same audio energy to the expected location of each ear of a front seat listener's position as was delivered before the far-field speakers were shut off may comprise adjusting an equalization of the near field speakers. A transfer function from each far-field speaker that was shut off to the expected location of each ear of a front seat listener's position may be known, and operating the pair of near-field speakers may comprise operating the pair of near-field speakers so as to approximate the transfer functions from each far-field speaker that was shut off, to the expected location of each ear of a front seat listener's position. The motor vehicle audio system may comprise a user-operated switch that is part of an audio head unit and that can be operated so as to shut off one or more far-field speakers.

In another aspect a motor vehicle audio system includes at least one rear far-field speaker that is located behind a front seat of the motor vehicle, at least one near-field speaker located in front of the far-field speaker and close to an intended position of a listener's head, and an audio signal processor configured to detect when the rear far-field speaker is shut off while the near-field speaker remains on, and in response automatically increase the output energy of the near-field speaker.

Embodiments may include one of the following features, or any combination thereof. The audio signal processor may automatically increase the output energy of the near-field speaker by operating the near-field speaker so as to at least partially replace the audio energy lost when the rear far-field speaker was shut off. Operating the near-field speaker so as to at least partially replace the audio energy lost when the rear far-field speaker was shut off may comprise operating the near-field speaker so as to deliver approximately the same audio energy to the expected location of each ear of a front seat listener's position as was delivered before the far-field speaker was shut off. Operating the near-field speaker so as to deliver approximately the same audio energy to the expected location of each ear of a front seat listener's position as was delivered before the far-field speaker was shut off may comprise adjusting an equalization of the near field speaker.

Embodiments may include one of the following features, or any combination thereof. A transfer function from each far-field speaker that was shut off to the expected location of each ear of a front seat listener's position may be known, and the audio signal processor may automatically increase the output energy of the near-field speaker by operating the near-field speaker so as to approximate the transfer functions from each far-field speaker that was shut off, to the expected location of each ear of a front seat listener's position. The front seat of the motor vehicle may comprise a driver headrest and a passenger headrest, and the at least one near-field speaker may comprise a pair of near-field speakers in each front seat headrest. The at least one far-field speaker may comprise a plurality of rear far-field speakers, and the audio signal processor may automatically increase the output energy of the near-field speaker by operating the pair of near-field speakers in a headrest so as to approximately replace the audio energy lost at the expected location of each ear of a front seat listener's position. The system may further comprise a user-operated switch that is part of an audio head unit and that can be operated so as to shut off the far-field speaker.

DETAILED DESCRIPTION

Motor vehicle audio systems can have speakers located in the front and the rear of the vehicle. A motor vehicle audio system is operated in accordance with this disclosure such that when one or more speakers that are located rearward of (behind) the front seat are shut off, the output of one or more other speakers that are closer to the front seat passengers is automatically increased. One goal is to partially or fully replace the audio energy that was lost when the speakers were shut off. The system can also be operated such that this replacement energy is perceived by the listener to have come from the locations of the disabled speakers. In one non-limiting example, the system includes a pair of speakers mounted in each of the front seat headrests, close to the expected location of the listeners' ears. These speakers can be operated so as to approximate the transfer function from each speaker that was shut off to each ear of the front seat occupants. This way, the perceived sound does not change when the rear speakers are shut off.

Figure 1:
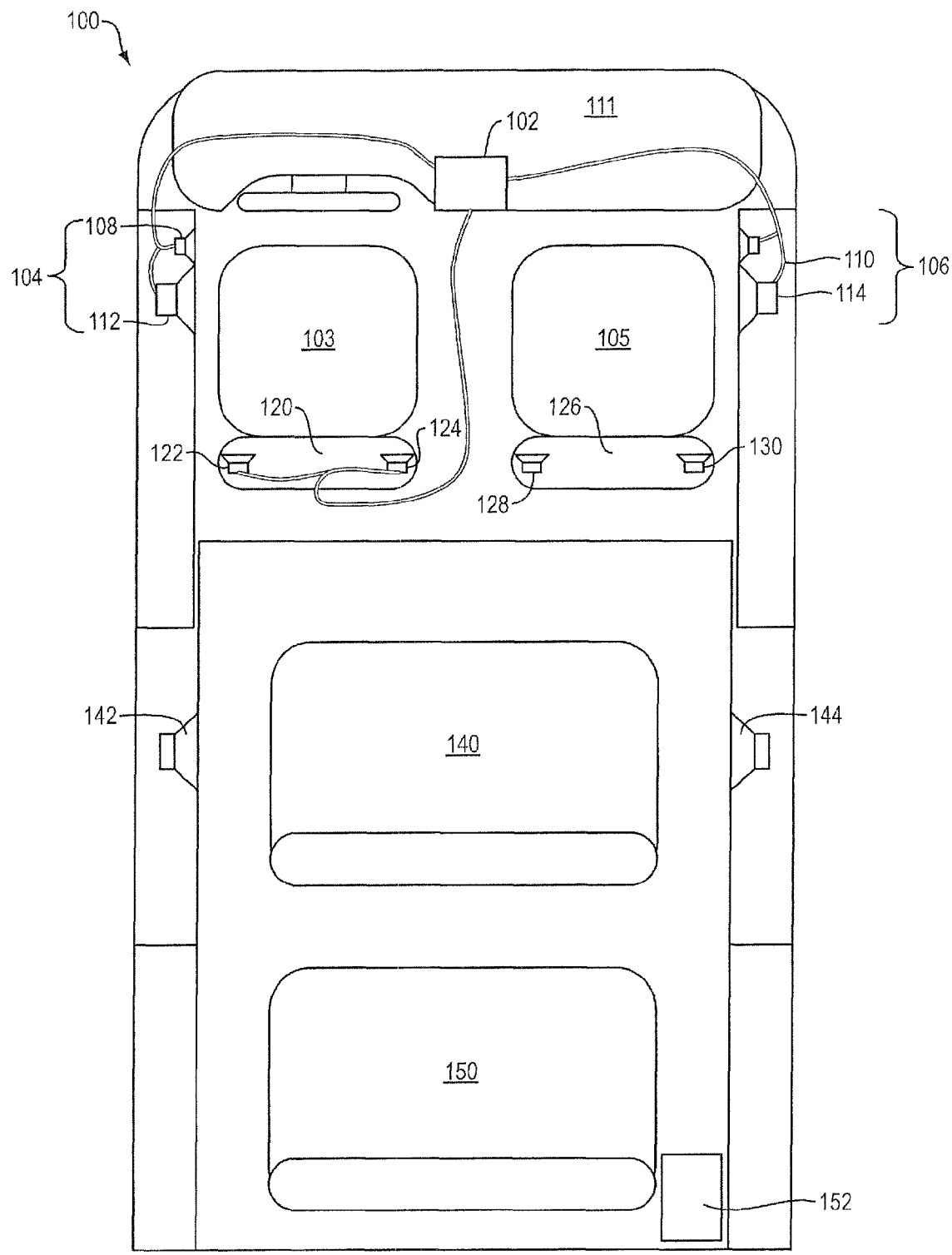
FIG. 1 is schematic diagram of a motor vehicle audio system.

Motor vehicle audio system 100, FIG. 1, includes head unit 102 that is typically but not necessarily mounted in the front dash. Head unit 102 sends audio signals to the speakers. There are one or more far-field speakers located behind the front seat area, and one or more near-field speakers located in front of the far-field speakers and close to an intended position of a front-seat listener's head (i.e., closer to the listener's ears than are the far field speakers). In this non-limiting example, left front door mounted near-field speaker set 104 includes tweeter 108 and low/mid-range speaker 112. Similarly, right front door mounted near-field speaker set 106 includes tweeter 110 and low/mid-range speaker 114. Driver's headrest 120 that is coupled to seat 103 includes left and right near-field speakers 122 and 124, respectively. Similarly, passenger headrest 126 that is coupled to seat 105 includes left and right near-field speakers 128 and 130, respectively. Left and right far-field rear door speakers 142 and 144 are also depicted, located in the vicinity of middle seat 140. Rear far-field bass box 152 may also be included, located near third-row (rear) seat 150. Speakers (not shown) may also be mounted in front deck 111 and/or a rear deck (if one exists). This disclosure is not limited to the particular arrangement shown in FIG. 1. Rather, it contemplates a motor vehicle audio system that has at least one rear far-field speaker that is located behind a front seat of the motor vehicle, and that also has at least one near-field speaker located in front of the far-field speaker and close to an intended position of a listener's head.

Audio system 100 is adapted to be operated in a manner such that it detects when one or more rear far-field speakers are shut off while one or more of the near-field speakers remain on, and in response system 100 automatically increases the output energy of the near-field speaker(s). In one non-limiting example, there is a pair of near-field speakers in each front headrest. However, the near field speakers can be other or additional speakers, such as speakers in the front door(s) and/or speakers in the front deck. The head unit can include a user-operable switch that can be operated to turn off the far-field speakers, or operation can be automatic, as described below.

Automatically increasing the output energy of the near-field speakers may be accomplished by operating the near-field speakers (e.g., the headrest speakers) so as to at least partially replace the audio energy lost when the rear far-field speakers were shut off. This can be accomplished by operating the near-field speakers so as to deliver approximately the same audio energy to the expected location of each ear of a front seat listener's position as was delivered by the far-field speakers before they were shut off, which can be done in one example by adjusting an equalization of the near field speakers.

In one non-limiting aspect of this disclosure, the transfer function from each far-field speaker that was shut off to the expected location of each ear of a front seat listener's position is known. The near-field speakers can be operated so as to approximate the transfer functions from each such far-field speaker to the expected location of each ear of a front seat listener's position.

When far-field speakers that are located behind the front seat are shut off, the sound that is perceived by the front seat passengers will change. This is due to the fact that no audio energy will be received from the locations of the disabled far-field speakers. The effects can be ameliorated by altering the output of one or more near-field speakers so as to mimic the sound that had been received by each ear of front seat passengers from the now-disabled speakers. In a non-limiting example, the headrest speakers are used as the near-field speakers that replace some or all of the energy lost when far field speakers are shut off.

Figure 2:
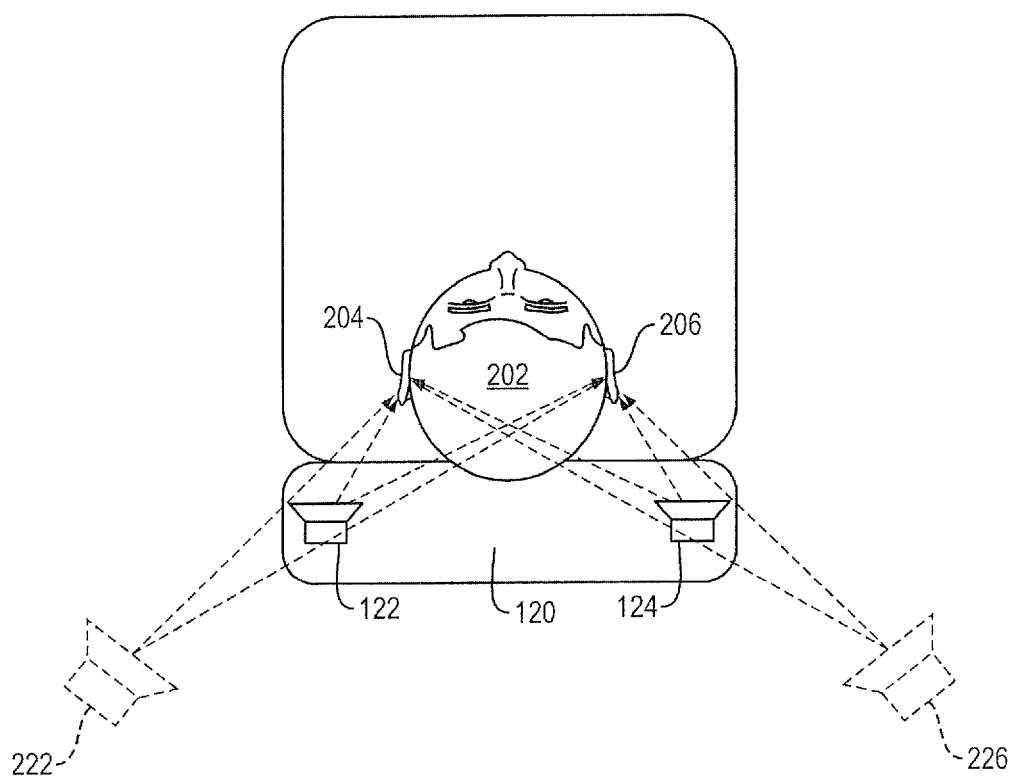
FIG. 2 schematically illustrates a result of the audio system.

In one example, the transfer functions from the far field speakers to each ear of a front seat listener are known. When these far field speakers are shut off, audio system 100 can be operated such that the headrest speakers are operated so as to effectively replace the far field speakers. This concept can be illustrated by FIG. 2, which depicts the top of the driver's head 202, and left and right ears 204 and 206. Headrest speakers 122 and 124 output sound that is received by each ear (as indicated by the dashed lines). The passenger similarly hears sound generated by the passenger side headrest speakers. Human perception of the direction and distance of sound sources is based on a combination of arrival time differences between the ears, signal level differences between the ears, and the particular effect that the listener's anatomy has on sound waves entering the ears from different directions, all of which is frequency dependent. The combination of these factors at both ears, for a source at a given location, is known as the binaural response for that location. Binaural signal filters are used by the audio system to shape sound that will be reproduced at a speaker at one location, to sound like the sound originated at another location.

Binaural signal filters can be developed by head unit 102 to effectively create "virtual" sound sources 222 and 226, which deliver audio energy to both ears as depicted by the dashed arrows. Binaural signal filters modify the sound reproduced by the near field headrest speakers 122 and 124 so that the listener perceives the sound as if it was coming from these virtual sources. Binaural signal filters can be developed that place such "virtual" speakers at the locations of the far field speakers that have been disabled. In this manner, the perception of the listener does not change when the far field speakers are shut off.

Control of motor vehicle audio systems so as to create "virtual" speakers is further described in U.S. patent application Ser. No. 13/888,927 filed on May 7, 2013, entitled "Signal Processing for a Headrest-Based Audio System," and in U.S. patent application Ser. No. 13/906,997, filed on May 31, 2013, entitled "Sound Stage Controller for a Near-Field Speaker-Based Audio System." The disclosures of both of these prior applications are incorporated herein by reference in their entirety.

Figure 3:
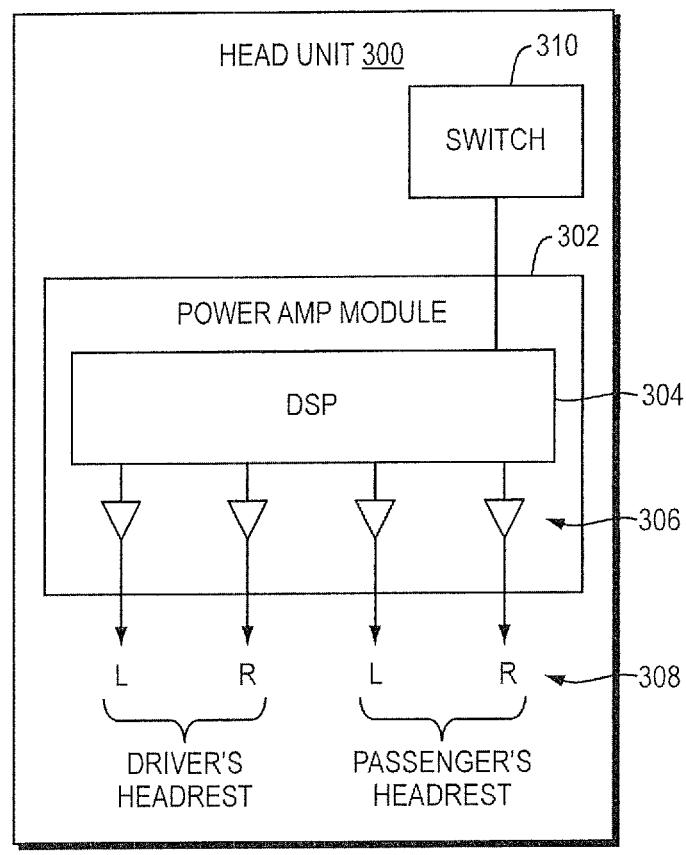
FIG. 3 is a schematic diagram of a head unit for the motor vehicle audio system.

Head unit 300, FIG. 3, may be used in the subject system and method. Head unit 300 includes power amplifier module 302 that has digital signal processor (DSP) 304. DSP 304 outputs audio signals that are amplified by amplifier stage 306 and outputted to the left and right near field headrest speakers, as indicated by outputs 308. Switch 310 (which is preferably but not necessarily user-operated) is used to shut off one or more far field speakers. The switch state is input to module 302. DSP 304 is programmed such that when it receives a signal indicating that far field speakers have been shut off, it outputs headrest audio signals that result in the speakers outputting energy that compensates, fully or partially, for the energy that was lost at each ear when the far field speakers were shut off. DSP 304 can be programmed to accomplish binaural signal filters that can modify the headrest speakers' outputs such that the transfer functions from the far field speakers to each ear are approximated by the headrest speakers.

In one non-limiting example the system and method can be accomplished in part as follows. The energy that arrives at each ear from each speaker, and at different frequencies, can be measured a priori at a particular seating location, using a dummy. The energy gain versus frequency for each far field speaker (or, for groups of far field speakers) can be measured. An average energy at each ear can also be calculated. The system can then be operated such that the front headrest speakers are used to deliver the same (or a very similar) energy (or, the same average energy) when the rear speakers are shut off.

Switch 310 can be manual, or automatic. An automatic switch can be based on sensing whether there are any occupants of the seat in question. For example, the audio system can be designed such that the rear speakers are shut off whenever there is an occupant of a rear seat, or perhaps of any seat behind the front seat (in a case where the motor vehicle includes more than two rows of seating).

As an alternative to using the near field speakers to approximate the transfer functions from the far field speakers to each ear, the near field speakers may be used to replace some or all of the energy that was lost at each ear when the far field speakers were shut off. One manner in which this can be accomplished is by adjusting the equalization of the headrest speakers such that the user receives at each ear approximately the same amount of energy as the user had received before the far field speakers were shut off.

Embodiments of the systems and methods described above comprise computer components and computer-implemented steps that will be apparent to those skilled in the art. For example, it should be understood by one of skill in the art that the computer-implemented steps may be stored as computer-executable instructions on a computer-readable medium such as, for example, floppy disks, hard disks, optical disks, Flash ROMS, nonvolatile ROM, and RAM. Furthermore, it should be understood by one of skill in the art that the computer-executable instructions may be executed on a variety of processors such as, for example, microprocessors, digital signal processors, gate arrays, etc. For ease of exposition, not every step or element of the systems and methods described above is described herein as part of a computer system, but those skilled in the art will recognize that each step or element may have a corresponding computer system or software component. Such computer system and/or software components are therefore enabled by describing their corresponding steps or elements (that is, their functionality), and are within the scope of the disclosure.

A number of implementations have been described. Nevertheless, it will be understood that additional modifications may be made without departing from the scope of the inventive concepts described herein, and, accordingly, other embodiments are within the scope of the following claims.

What is claimed is:

1. A method of operating a motor vehicle audio system that has at least one rear far-field speaker that is located behind front seats of the motor vehicle, wherein the front seats of the motor vehicle comprise a driver headrest and a passenger headrest, and wherein the motor vehicle audio system comprises a pair of near-field speakers in each such front seat headrest, the method comprising:

detecting when a rear far-field speaker is shut off while at least one near-field speaker remains on; and in response automatically operating the pair of near-field speakers in a headrest so as to deliver approximately the same audio energy to the expected location of each ear of a front seat listener's position as was delivered before the far-field speaker was shut off.

2. The method of claim 1 wherein operating the pair of near-field speakers in a headrest so as to deliver approximately the same audio energy to the expected location of each ear of a front seat listener's position as was delivered before the far-field speaker was shut off comprises adjusting an equalization of the pair of near field speakers in a headrest.

3. The method of claim 1 wherein a transfer function from each far-field speaker that was shut off to the expected location of each ear of a front seat listener's position is known, and wherein operating the pair of near-field speakers in a headrest so as to deliver approximately the same audio energy to the expected location of each ear of a front seat listener's position as was delivered before the far-field speaker was shut off comprises operating the pair of near-field speakers so as to approximate the transfer functions from each far-field speaker that was shut off, to the expected location of each ear of a front seat listener's position.

4. The method of claim 1 wherein the motor vehicle audio system comprises a user-operated switch that is part of an audio head unit and that can be operated so as to shut off one or more far-field speakers.

5. The method of claim 1 wherein the audio system comprises left and right rear door speakers.

6. The method of claim 1 wherein operating the pair of near-field speakers in a headrest so as to deliver approximately the same audio energy to the expected location of each ear of a front seat listener's position as was delivered before the far-field speaker was shut off comprises using binaural signal filters to modify the outputs of the pair of near-field speakers in a headrest.

7. The method of claim 6 wherein the binaural signal filters are accomplished using a programmed digital signal processor.

8. The method of claim 1 wherein the motor vehicle audio system comprises an automatic switch that is based on sensing an occupant of a motor vehicle seat behind the front seat.

9. The method of claim 8 wherein the automatic switch shuts off a rear far-field speaker when an occupant of a motor vehicle seat behind the front seat is sensed.

10. A motor vehicle audio system for a motor vehicle with front seats that comprise a driver headrest and a passenger headrest, comprising:
at least one rear far-field speaker that is located behind the front seats of the motor vehicle;
a pair of near-field speakers in each of the driver and passenger headrests; and
an audio signal processor configured to detect when a rear far-field speaker is shut off while at least one near-field speaker remains on, and in response automatically operating the pair of near-field speakers in a headrest so as to deliver approximately the same audio energy to the expected location of each ear of a front seat listener's position as was delivered before the far-field speaker was shut off.

11. The system of claim 10 wherein operating the pair of near-field speakers in a headrest so as to deliver approximately the same audio energy to the expected location of each ear of a front seat listener's position as was delivered before the far-field speaker was shut off comprises adjusting an equalization of the near field speaker.

12. The system of claim 10 wherein a transfer function from each far-field speaker that was shut off to the expected location of each ear of a front seat listener's position is known, and wherein the audio signal processor automatically increases the output energy of the pair of near-field speakers in a headrest so as to deliver approximately the same audio energy to the expected location of each ear of a front seat listener's position as was delivered before the far-field speaker was shut off, by operating the pair of near-field speakers so as to approximate the transfer functions from each far-field speaker that was shut off, to the expected location of each ear of a front seat listener's position.

13. The system of claim 10 wherein the at least one rear far-field speaker comprises a plurality of rear far-field speakers, and wherein the audio signal processor automatically increases the output energy of the pair of near-field speakers in a headrest by operating the pair of near-field speakers in a headrest so as to approximately replace the audio energy lost at the expected location of each ear of a front seat listener's position.

14. The system of claim 10 further comprising a user-operated switch that is part of an audio head unit and that can be operated so as to shut off the far-field speaker.

15. The system of claim 10 wherein the audio system comprises left and right rear door speakers.

16. The system of claim 10 wherein operating the pair of near-field speakers in a headrest so as to deliver approximately the same audio energy to the expected location of each ear of a front seat listener's position as was delivered before the far-field speaker was shut off comprises using binaural signal filters to modify the outputs of the pair of near-field speakers in a headrest.

17. The system of claim 16 wherein the binaural signal filters are accomplished using a programmed digital signal processor.

18. The system of claim 10 wherein the motor vehicle audio system comprises an automatic switch that is based on sensing an occupant of a motor vehicle seat behind the front seat.

19. The system of claim 18 wherein the automatic switch shuts off a rear far-field speaker when an occupant of a motor vehicle seat behind the front seat is sensed.

* * * * *